(12) United States Patent
Schmidt

(10) Patent No.: US 6,208,872 B1
(45) Date of Patent: Mar. 27, 2001

(54) METHOD AND APPARATUS FOR INHIBITION OF CALLS WHILE ROAMING

(75) Inventor: Paul Schmidt, Lynchburg, VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/148,128

(22) Filed: Sep. 4, 1998

(51) Int. Cl.[7] ..................................................... H04Q 7/28
(52) U.S. Cl. .......................... 455/518; 455/416; 455/432; 455/519; 455/520
(58) Field of Search ..................................... 455/518, 519, 455/520, 432, 458, 416, 414, 517, 415

(56) References Cited

U.S. PATENT DOCUMENTS

| | | |
|---|---|---|
| 5,142,654 | 8/1992 | Sonberg et al. . |
| 5,465,391 * | 11/1995 | Toyryla ................................. 455/518 |
| 5,506,837 | 4/1996 | Söllner et al. . |
| 5,513,381 * | 4/1996 | Sasuta ................................... 455/520 |
| 5,970,417 * | 10/1999 | Toyryla et al. ....................... 455/520 |
| 6,097,942 * | 8/2000 | Laiho .................................... 455/519 |

FOREIGN PATENT DOCUMENTS

| | | |
|---|---|---|
| 0788298 * | 2/1997 | (EP) ..................................... 455/432 |
| 0 788 287 | 8/1997 | (EP) . |
| WO 93 03585 | 2/1993 | (WO) . |

* cited by examiner

*Primary Examiner*—Lee Nguyen
*Assistant Examiner*—Simon Nguyen
(74) *Attorney, Agent, or Firm*—Wood, Phillips, VanSanten, Clark & Mortimer

(57) ABSTRACT

A method of selectively connecting group phone calls to a roaming mobile station. A mobile station is provided for use in a wireless communication system for selectively originating and receiving group phone calls. The mobile station includes a memory storing a plurality of group phone numbers for each group of which the mobile station is a member, and roam originate and receive enable flags for each group phone number. The roam originate and receive enable flags are selectively settable between first and second states to either permit or prohibit group calls to be originated from, or received at, the mobile station while the mobile station is roaming.

20 Claims, 5 Drawing Sheets

| | 60 | 62 | 64 | 66 | 68 |
|---|---|---|---|---|---|
| 1 | GROUP NO. 1 | ALPHA TAG 1 | ROEF - 1 | RREF - 1 |
| 2 | GROUP NO. 2 | ALPHA TAG 2 | ROEF - 2 | RREF - 2 |
| 3 | GROUP NO. 3 | ALPHA TAG 3 | ROEF - 3 | RREF - 3 |
| | ○ | ○ | ○ | ○ |
| | ○ | ○ | ○ | ○ |
| | ○ | ○ | ○ | ○ |
| 25 | GROUP NO. 25 | ALPHA TAG 25 | ROEF - 25 | RREF - 25 |
| 26 | PHONE NO. 26 | ALPHA TAG 26 | | |
| 27 | PHONE NO. 27 | ALPHA TAG 27 | | |
| | ○ | ○ | | |
| | ○ | ○ | | |
| | ○ | ○ | | |
| 130 | PHONE NO. 130 | ALPHA TAG 130 | | |
| | GROUP ONLY | MEMORY ONLY | | |
| | 70 | 72 | | |

58

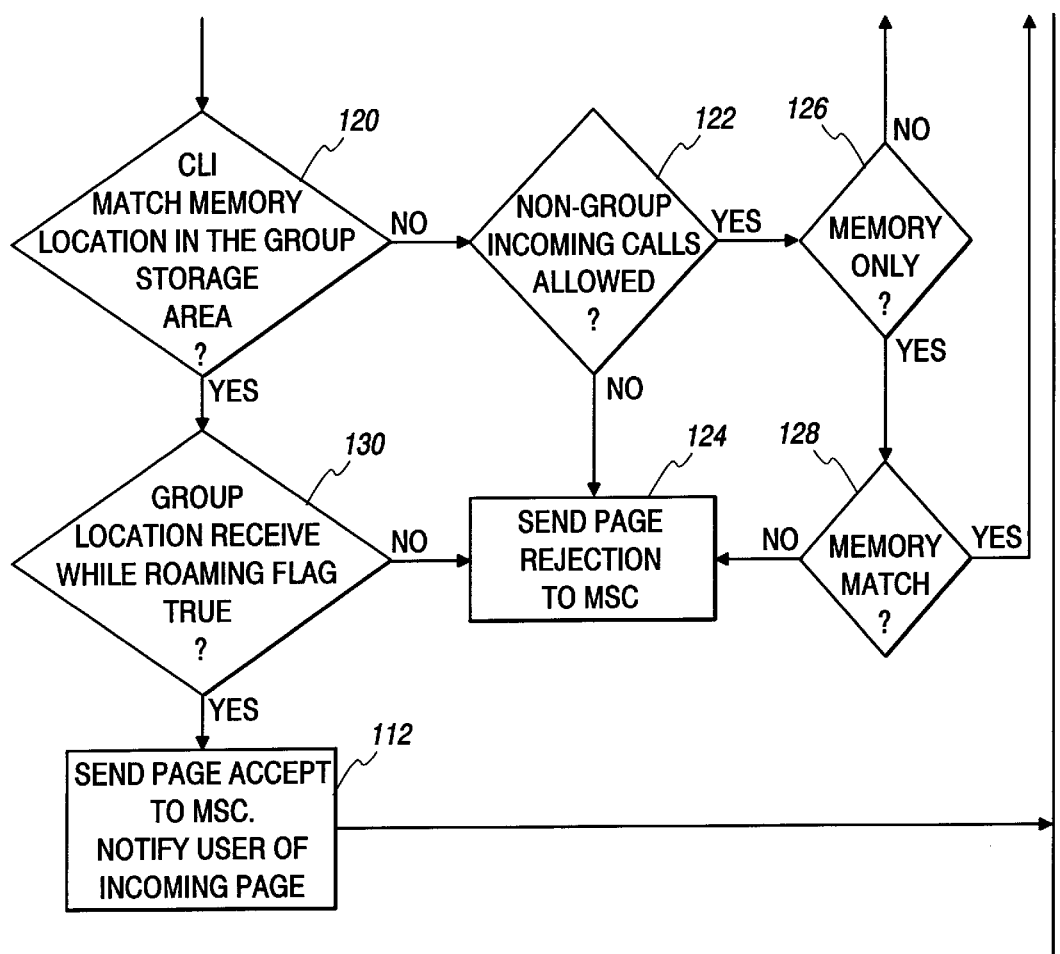
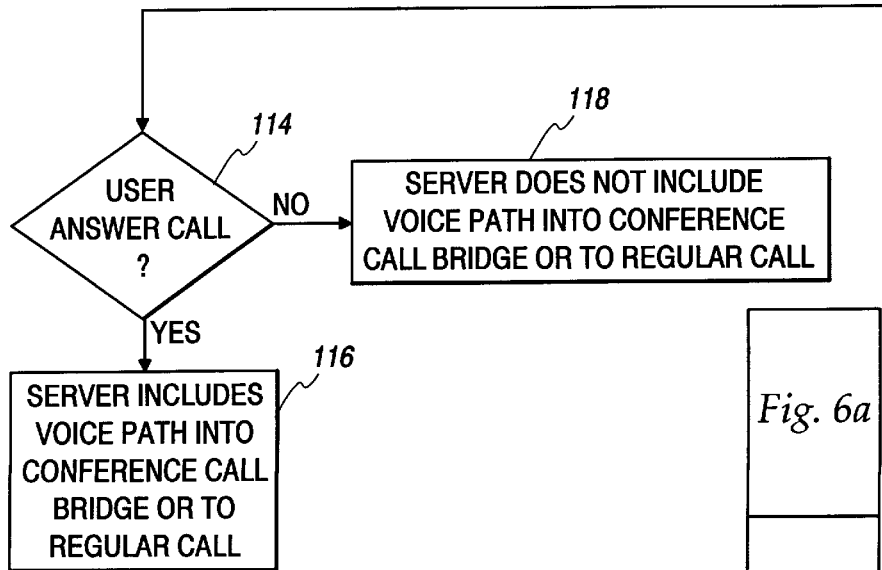
Fig. 6b
Fig. 6a
Fig. 6b

METHOD AND APPARATUS FOR INHIBITION OF CALLS WHILE ROAMING

FIELD OF THE INVENTION

The present invention is directed toward receiving and originating calls in a wireless communication system and, more particularly, toward a method and apparatus for inhibiting the receipt and/or origination of calls by a roaming mobile station.

BACKGROUND OF THE INVENTION

The operation of cellular communication systems is fairly well known. A mobile station, such as a cellular telephone, has the ability to roam to other cellular systems, i.e., a cellular system other than its home system (the home system being the cellular system in which the user of the mobile station has an account), and place and/or receive calls. However, a roaming mobile station will incur roaming charges, and possibly long distance charges, when placing or receiving calls of any type, i.e., calls to/from land-lines, calls to/from other mobile stations, calls to/from groups, etc. Such roaming charges may be as high as 10× the normal rate per minute charge that would be incurred if the mobile station were communicating in its home system.

In the case of a company providing mobile stations to its employees for work use, the company may not wish the employee to originate or receive calls when the employee takes a mobile station out of its home system. Presently, a company has the following choices in how it may limit calls originating from its mobile stations: (1) Allow all (can dial any number); (2) Restrict all (can't dial any number); (3) Local calls+800# only (thus restricts all roaming calls); (4) Memory only; (5) Local calls+800#+ Memory only; (6) Restrict international calls, (7) Restrict 900# calls, and (8) Restrict operator calls.

With respect to receiving calls at the mobile station, a company has only two choices, namely, it can either (1) allow all incoming calls, or (2) prohibit all incoming calls.

Thus, a company attempting to restrict the use of its mobile stations by its employees is limited in its choices. In order to prohibit a mobile station from originating roaming calls, the company's only choice is to limit the mobile station to originating local and 800# calls. However, this means that the employee cannot make any long distance calls from the mobile station even though the company may wish the employee to be able to dial certain particular numbers at any time. While the company could store these particular numbers in the memory of the mobile station and restrict the employee to the memory only dial lock feature, this restricts the employee to dialing out to only the phone numbers stored in the memory, which may also be undesirable to the company.

A company wishing to restrict the receipt of calls by its mobile stations while they are roaming has even fewer choices. The company must either allow the mobile station to receive all incoming calls, including roaming calls, or restrict all calls to the mobile station, thus rendering the employee unreachable through his/her mobile station.

The present invention is directed toward overcoming one or more of the above-mentioned problems.

SUMMARY OF THE INVENTION

A method is provided for placing a phone call from an originating mobile station to a group of receiving stations collectively having a group identification number, the method including the steps of (a) initiating a call at the originating mobile station to a selected group identification number, (b) determining if the originating mobile station is in a roaming condition, (c) if the originating mobile station is roaming as determined at step (b), determining whether the originating mobile station is permitted to place calls to the selected group identification number while roaming, and (d) if the originating mobile station is permitted to place calls to the selected group identification number while roaming as determined at step (c), placing a call to a selected group of receiving stations defined by the selected group identification number.

In one form, the method further includes the step of (e) if the originating mobile station is not permitted to place calls to the selected group identification number while roaming as determined at step (c), informing a user that the call is forbidden while roaming.

In another form, there are a plurality of wireless communication systems each having a discrete system identification number and distinct geographical boundaries, one of said plurality of wireless communication systems being a home wireless communication system associated with the originating mobile station, with the originating mobile station physically within the geographical boundaries of the home wireless communication system in a non-roaming condition, the home wireless communication system having a home system identification number stored in a memory in the originating mobile station, and wherein step (b) includes the steps of (b1) receiving, at the originating mobile station, a system identification number of a wireless communication system within which the originating mobile station has initiated a call to the selected group identification number, and (b2) determining if the received system identification number matches the home system identification number.

In still another form, the method further includes the steps of (f) storing a plurality of group identification numbers in a memory at the originating mobile station, one of said plurality of group identification numbers being the selected group identification number, and (g) storing a roamenable flag in the memory for each of the plurality of group identification numbers, each roam-enable flag selectively settable between (a) a first state permitting calls to a particular group identification number with which it is associated with the originating mobile station in a roaming condition, and (b) a second state prohibiting calls to the particular group identification number with which it is associated with the originating mobile station in a roaming condition, wherein step (c) comprises the step of checking the state of the roam-enable flag associated with the selected group identification number.

A method is also provided for connecting a phone call from an originating station having an originating identification number to a plurality of receiving stations collectively having a group identification number, the method including the steps of (a) initiating a call request at an originating station to a selected group identification number, (b) receiving the call request, with the selected group identification number, at a Group Call Server (GCS), (c) routing a page message to each of a plurality of receiving stations included within the selected group, (d) receiving the page message at a select one of the plurality of receiving stations, said select receiving station comprising a mobile station, (e) determining if the select mobile receiving station is in a roaming condition, (f) if the select mobile receiving station is roaming as determined at step (e), determining if the received page message defines a group call, (g) if the received page message defines a group call as determined at step (f), determining whether the select mobile receiving station is permitted to receive calls from the selected group identification number while roaming, and (h) accepting the call from the originating station if all of the conditions in steps (e)–(g) are determined to be present.

In one form, the step of accepting the call from the originating station includes the step of activating an indicator at the select mobile receiving station alerting a user to an incoming call.

In another form, the activating step generates a ringing tone at the select mobile receiving station.

In another form, there are a plurality of wireless communication systems each having a discrete system identification number and distinct geographical boundaries, one of said plurality of wireless communication systems being a home wireless communication system associated with the select mobile receiving station, with the select mobile receiving station physically within the geographical boundaries of the home wireless communication system in a non-roaming condition, the home wireless communication system having a home system identification number stored in a memory in the select mobile receiving station, and wherein step (e) includes the steps of (e1) receiving, at the select mobile receiving station, a system identification number of a wireless communication system within which the select mobile receiving station has received the page message, and (e2) determining if the received system identification number matches the home system identification number.

In yet another form, the originating identification number is included in a Caller Line Identification (CLI) field of the initiated call request, wherein the method further includes the steps of (i) replacing the originating identification number with the selected group identification number in the CLI field at the GCS, and (j) storing, in a predetermined memory location at the select mobile receiving station, group identification numbers for each group of which the select mobile receiving station is a member, wherein step (f) comprises the step of determining if the selected group identification number in the CLI field of the page message matches any of the plurality of group identification numbers stored in the predetermined memory location at the select mobile receiving station.

In still another form, the method further includes the steps of (k) storing, in a memory at the select mobile receiving station, group identification numbers for each group of which the select mobile receiving station is a member, and (l) storing a roam-enable flag in the memory for each of the group identification numbers, each roam-enable flag selectively settable between (a) first state permitting calls from a particular group identification number to be received at the select mobile receiving station with the select mobile receiving station in a roaming condition, and (b) a second state prohibiting calls from the particular group identification number to the select mobile receiving station with the select mobile receiving station in a roaming condition, wherein step (g) comprises the step of checking the state of the roam-enable flag associated with the selected group identification number.

A method is also provided for connecting a phone call from an originating mobile station having an originating identification number to a group of receiving stations collectively having a group identification number, the method includes the steps of (a) initiating a call request at the originating mobile station to a selected group identification number, (b) determining if the originating mobile station is in a roaming condition, (c) if the originating mobile station is roaming as determined at step (b), determining whether the originating mobile station is permitted to place calls to the selected group identification number while roaming, and (d) if the originating mobile station is permitted to place calls to the selected group identification number while roaming as determined at step (c), (d1) sending the initiated call request to a Group Call Server (GCS), (d2) receiving the call request, with the selected group identification number, at the GCS, (d3) routing a page message to each of a group of receiving stations included within the selected group, (d4) receiving the page message at a select one of the group of receiving stations, said select receiving station comprising a mobile station, (d5) determining if the select mobile receiving station is in a roaming condition, (d6) if the select mobile receiving station is roaming as determined at step (d5), determining if the received page message defines a group call, (d7) if the received page message defines a group call as determined at step (d6), determining whether the select mobile receiving station is permitted to receive calls from the selected group identification number while roaming, and (d8) accepting the call from the originating mobile station if all of the conditions in steps (d5)–(d7) are determined to be present.

A mobile station is also provided for use in a wireless communication system for selectively placing group phone calls to a plurality of receiving stations included within a selected group, the mobile station including a memory storing a plurality of group phone numbers and a roam origination enable flag for each group phone number, said roam origination enable flags selectively settable between (a) a first state permitting calls to a particular group phone number with the mobile station in a roaming condition, and (b) a second state prohibiting calls to the particular group phone number with the mobile station in a roaming condition, a call initiator operable by a user to initiate a call to one of the plurality of group phone numbers stored in the memory, a first determinator determining whether the mobile station is in a roaming condition, a second determinator adapted to determine the state of the roam origination enable flag associated with said one of the plurality of group phone numbers, and a processor adapted to block call transmission responsive to the first and second determinators.

A mobile station is provided for use in a wireless communication system for selectively receiving group phone calls from an originating station, the mobile station including a memory storing a plurality of group phone numbers for each group of which the mobile station is a member and a roam receive enable flag for each group phone number, said roam receive enable flags selectively settable between (a) a first state permitting calls from a particular group phone number to be received at the mobile station with the mobile station in a roaming condition, and (b) a second state prohibiting calls from the particular group phone number to be received at the mobile station with the mobile station in a roaming condition, a transceiver adapted to receive a signal, including a group phone number, indicating that a call has been placed to the mobile station, a first determinator adapted to determine if the mobile station is in a roaming condition, a second determinator adapted to determine if the received signal defines a group call, a third determinator adapted to determine the state of the roam receive enable flag associated with the received group phone number; and an accepter adapted to accept the call responsive to the first, second and third determinators.

It is an object of the present invention to selectively control the use of a mobile station.

It is a further object of the present invention to permit an owner to selectively control the use of its mobile stations by others.

It is yet a further object of the present invention to restrict an employee's personal use of employer owned mobile stations.

It is still a further object of the present invention to minimize costs associated with employer owned mobile stations.

Other aspects, objects and advantages of the present invention can be obtained from a study of the application, the drawings, and the appended claims.

BRIEF DESCRIPTION OF THE DRAWINGS

FIGS. 6a–b is a flow chart illustrating call receipt by the mobile station according to the present invention.

DETAILED DESCRIPTION OF THE PREFERRED EMBODIMENT

Figure 1:
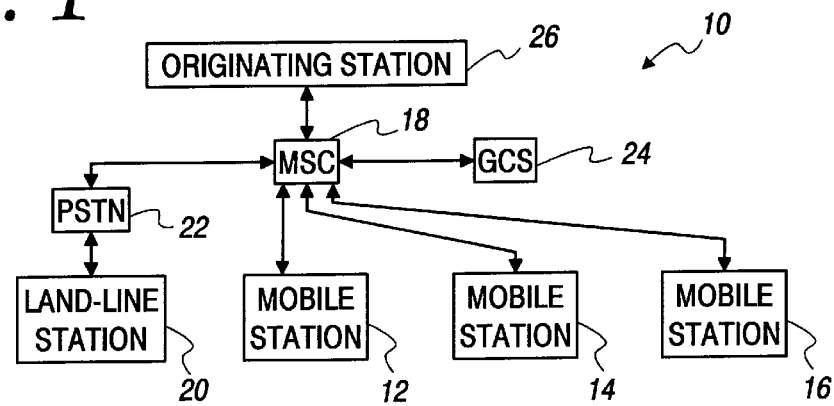
FIG. 1 is a block diagram of a standard communication system in which the present invention may be utilized.

Referring to FIG. 1, a communication system, shown generally at 10, is illustrated in which the present invention may be utilized. Mobile stations 12, 14, 16 may communicate with one another via a Mobile Switching Center (MSC) 18. For convenience, the base station and base station controller, which establish the communication link between the mobile stations 12, 14, 16 and the MSC 18 have been omitted. The mobile stations 12, 14, 16 may also communicate with a land-line station 20 via a Public Switching Telephone Network (PSTN) 22.

A Group Call Server (GCS) 24 communicates with the MSC 18. The GCS 24 is essentially a conference calling bridge and can be a shared resource among many MSC's 18 within the communication system 10.

The GCS 24 permits group phone calls to be made between numerous terminating units, whether they be mobile stations, land-line phones, etc. A group phone call is essentially a conference call between at least three parties. A group may include land-line stations, mobile stations, and/or any type of communication device that has a dialable 10-digit number and is accessible through a cellular network and/or a PSTN. The GCS 24 has a group member database that includes each group phone number and a list of all of the individual phone numbers of the various members within the particular group.

Assume that a particular group includes mobile stations 12, 14, 16, land-line station 20 and originating station 26 as its members. When the originating station 26 places a call to the group by dialing the group phone number, the group phone number is transmitted to the MSC 18. The GCS 24 receives the group phone number from the MSC 18 and identifies the various members of the group in its database, and generates a separate call to each group member through the MSC 18. The MSC 18 then routes the separate calls to each of the terminating units, namely, mobile stations 12, 14, 16 and land-line station 20. As the call to each terminating unit is connected, the GCS 24 includes a voice path to the conference call bridge.

Figure 2:
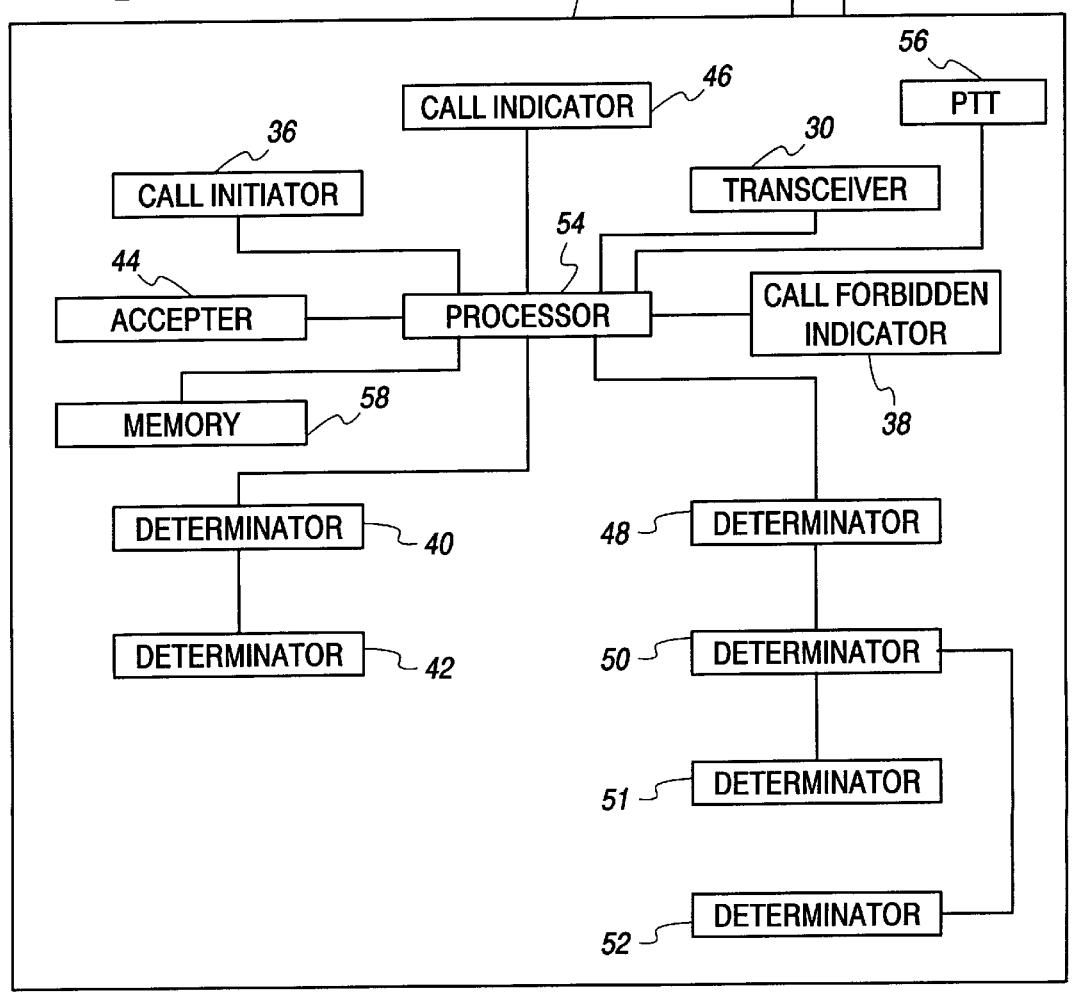
FIG. 2 is a block diagram of the inventive mobile station.

Referring to FIG. 2, a mobile station according to the invention is shown at 28. The mobile station 28 includes a transceiver 30 for transmitting and receiving communication signals 32 via antenna 34; a call initiator 36 for initiating calls by a user; a call forbidden indicator 38 informing the user that a particular outgoing call is forbidden; determinators 40,42 utilized in determining which outgoing calls may be transmitted; an acceptor 44 permitting the mobile station 28 to accept incoming calls; a call indicator 46 informing the user that it has an incoming call; and determinators 48,50, 51,52 utilized in determining which calls may be received by the mobile station 28. Operation of all of the above-identified elements are controlled by a processor 54.

The mobile station 28 may also includes a Push-To-Talk (PTT) button 56 permitting the mobile station 28 to be employed in much the same way as dispatch radios. For instance, transmission occurs when the PTT button 56 is depressed, which unmutes a microphone (not shown) and mutes a speaker (not shown) on the mobile station 28, thus permitting the user to transmit a voice signal. When the PTT button 56 is released, the microphone is muted and the speaker is unmuted so that the user may listen to incoming voice signals.

The mobile station 28 also includes a memory 58 which is also controlled by the processor 54. The memory 58 is a storage area utilized as a phone book where users may program both phone numbers and alphanumeric tags (alpha tags) (e.g., names) associated with these numbers. The memory 58 is preferably a non-volatile memory surviving power-up and power-down of the mobile station 28.

Figures 3, 4:
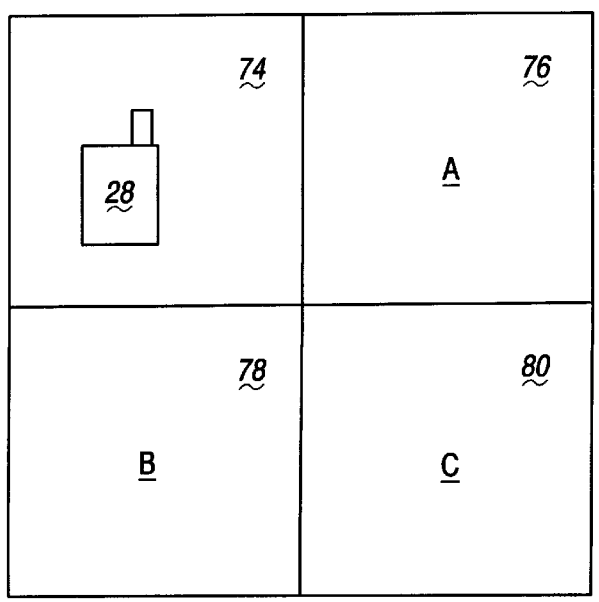
FIG. 3 is an expanded diagram of the memory shown in FIG. 2.
FIG. 4 depicts four separate wireless communication systems and illustrates roaming of the mobile station in separate systems.

FIG. 3 illustrates the structure of the memory 58. The memory 58 includes a first area 60 for storing a memory location identified number. A second area 62 stores the phone numbers. As illustrated in FIG. 3, the first twenty five memory locations have been allocated for group phone numbers, while the remaining memory locations (26–130) are utilized for conventional phone numbers, although other allocation schemes could be used with the present invention. A third area 64 stores the alpha tags associated with each phone number. The alpha tags are a string of alpha-numeric characters which are generally set by the user to readily identify particular phone numbers. A fourth area 66 stores a Roam Origination Enable Flag (ROEF) for each of the group phone numbers. The ROEF may be a binary bit having two states, "0" and "1". With the ROEF in state "1", roam origination is enabled and the mobile station 28 may place a group call to that particular group phone number while roaming. With the ROEF in state "0", roam origination is disabled and the mobile station 28 may not place a group call to that particular group phone number while roaming.

A fifth area 68 in the memory 58 stores the Roam Receive Enable Flag (RREF) for each group phone number. The RREF may also be a binary bit having two states, "0" and "1". With the RREF in state "1", roam receive is enabled and the mobile station 28 may accept a group call from that particular group phone number. With the RREF in state "0", roam receive is disabled and the mobile station 28 may not receive a group call from that particular group phone number. Of course, the enable and disable states of the ROEF and RREF may be reversed.

The memory 58 also stores a group only flag 70 and a memory only flag 72. The group only 70 and memory only 72 flags are mutually exclusive in that only one is permitted to be enabled at a given time. With the group only flag 70 enabled, the mobile station 28 may only receive calls from any group phone number stored in the memory 58 which has an associated RREF which is enabled (state "1"). With the group only flag 70 disabled, the mobile station 28 is not restricted from receiving group calls while roaming and therefore the calling number is not checked against the group numbers in memory area 62 when a call is received. Enabling the memory only flag 72 restricts the mobile station 28 to receiving call only from those phone numbers, group or standard, which are stored in the memory 58. If the memory only flag 72 is disabled, no check is made against the numbers in memory area 62. The group only 70 and memory only 72 flags include a binary bit.

It should be noted that the ROEF and RREF only come into play if the mobile station 28 is in a roaming condition. Roaming essentially means that the mobile station 28 is out of its home system. The concept of roaming is illustrated in FIG. 4.

FIG. 4 depicts four separate wireless communication systems, or cellular systems, 74,76,78,80. Each system 74,76,78,80 services a different geographical area and, accordingly, includes distinct geographical boundaries. When a mobile station is within the geographical boundaries of a particular communication system, it will use that particular communication system to transmit its calls.

To illustrate how roaming occurs, it is assumed that the mobile station 28 has system 74 as its home system; that is, the user of mobile station 28 has an account with communication system 74. When the mobile station 28 travels outside of the geographical boundaries of system 74, it is considered to be roaming. That is, if the mobile station 28 travelled to position A, it would be roaming in system 76; if the mobile station 28 travelled to position B, it would be roaming in system 78; and, similarly, if the mobile station 28 travelled to position C, it would be roaming in system 80. The present invention is concerned with the transmission and receipt of calls when the mobile station 28 is in, for example, any of positions A, B or C, i.e., roaming.

Figure 5:
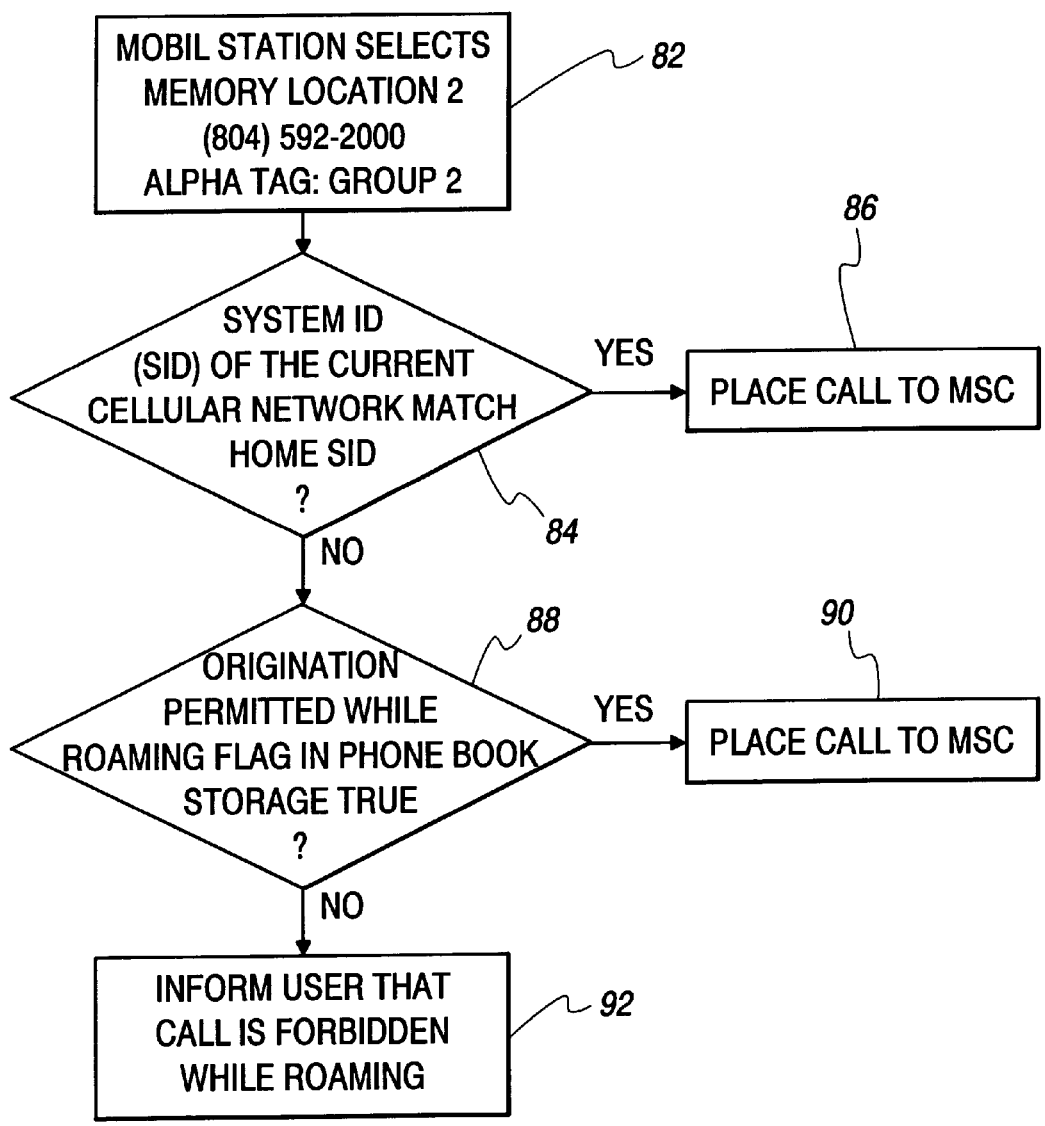
FIG. 5 is a flow chart illustrating call origination at the mobile station according to the present invention.
Figure 6A:
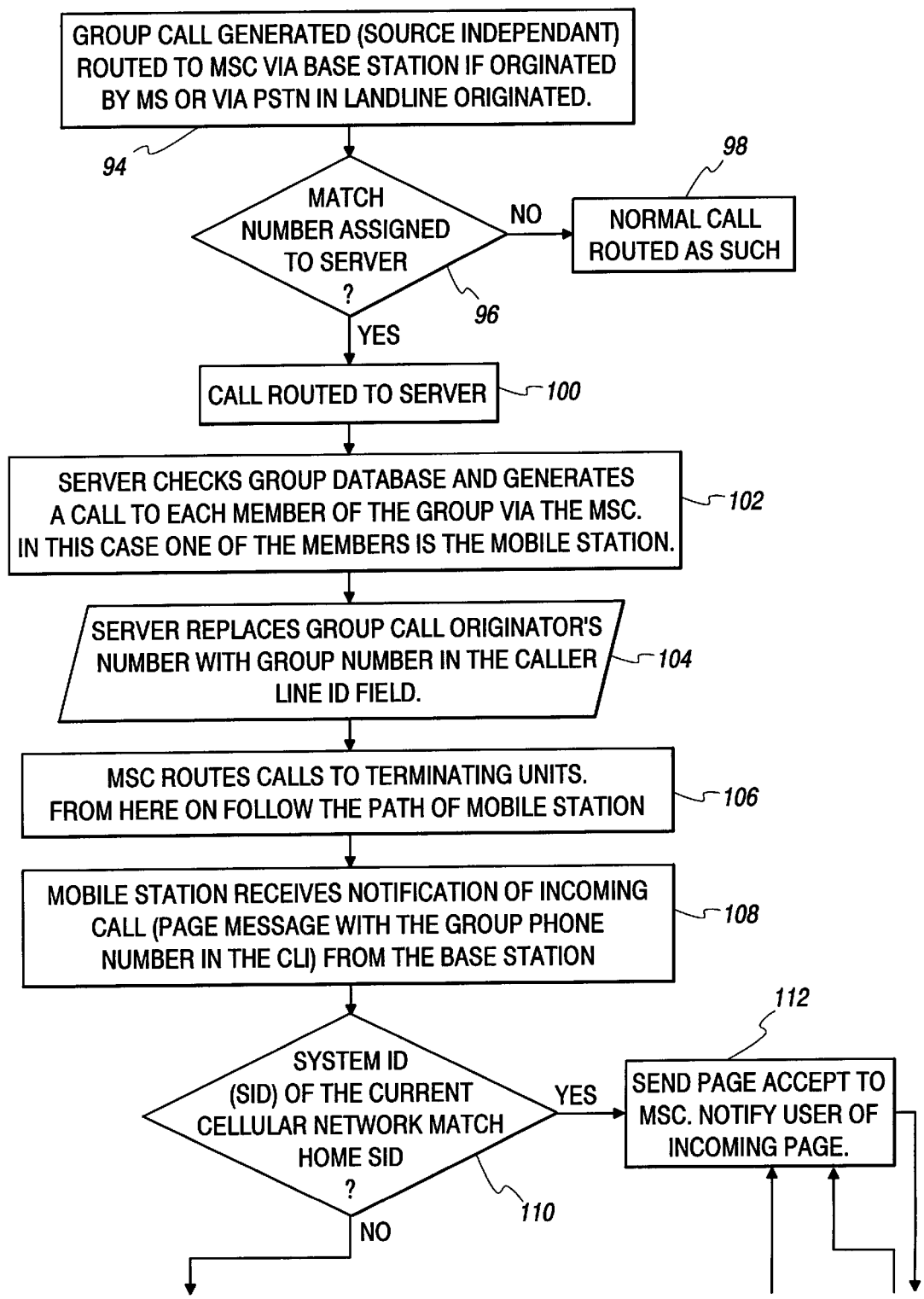

Referring to FIGS. 1, 2 and 5, group call origination operates as follows. The mobile station 28, via a user, selects one of the group phone numbers (e.g., Group No. 2) from the memory 58 to which it desires to place a call (block 82). This may be accomplished through either the call initiator 36 or the PTT button 56. The determinator 40 then checks to see if the mobile station 28 is roaming (block 84). The determinator 40 determines if the system ID number of the cellular network in which the mobile station 28 is currently located (the "current system ID number"), matches the system ID number of the mobile station's 28 home system (the "home system ID number"), which is conventionally stored in the mobile station 28 upon user opening an account. The current system ID number is received at the mobile station 28, via signal 85, as part of the overhead information, or bulletin board information, which is continuously provided over the air by the control channel of the various cellular networks. If the determinator 40 determines that the current system ID number matches the home system ID number, i.e., the mobile station 28 is in its home system, the group call is placed to the MSC 18 (block 86) and is conventionally routed to all of the members in the group via the GCS 24.

If the determinator 40 determines that the current system ID number does not match the home system ID number, i.e., the mobile station 28 is not in its home system and is roaming, then the determinator 42 determines the state of the ROEF (e.g., ROEF-2) for that particular group phone number. If the determinator 42 determines, at block 88, that ROEF-2 is in state "1" permitting calls to Group No. 2 while roaming, the group call is routed to the MSC (block 90) and is conventionally routed to the various members in the group via the GCS 24. If the determinator 42 determines, at block 88, that the ROEF-2 is in state "0" prohibiting calls to Group No. 2 while roaming, the processor 54 blocks the call and activates the call forbidden indicator 38 to inform the user that the call is forbidden while roaming (block 92).

Referring to FIGS. 1, 2 and 6*a–b*, receipt of group calls at the mobile station 28 operates as follows. First, a group call request is generated by a caller and is routed to the MSC 18 (block 94). The group call may be generated by a mobile station or a land-line phone via the PSTN. The MSC 18 determines if the call is a group call by determining whether the received phone number matches any of the group phone numbers assigned to the GCS 24 (block 96). If the received phone number does not match any of the group phone numbers assigned to the GCS 24, the call is not a group call, but is rather a normal call and is conventionally routed to the desired party (block 98).

If the call is determined to be group call at block 96, it is routed to the GCS 24 (block 100). The GCS 24 checks its group database and generates a call, or page message, to each member of the group via the MSC 18 (block 102), with one of the members being mobile station 28. The GCS 24 also replaces the group call originator's number (the number of the person who made the call) with the group phone number in the caller line ID field of the page message (block 104). The caller line ID feature is a well-known feature which identifies to the cellular phone user, or to a land-line phone user if they have a caller line ID attachment device, who has originated an incoming call. The user to whom the call is destined learns the identity of the call originator through the caller line ID field, which includes the call originator's phone number, and which is transmitted to the destined user in the page message of an incoming call. The MSC 18 then routes the page messages to the various terminating units (block 106), with the page messages now including the group phone number in the caller line ID field. The receipt of such a call by the mobile station 28 is as follows.

The mobile station 28 receives the page message from the MSC 18 indicating that it has an incoming call (block 108). The page message includes the group phone number in the caller line ID field. Upon receipt thereof, the determinator 48 determines if the system ID number of the cellular network in which the mobile station 28 is currently located matches the system ID number of the mobile station's 28 home system (block 110). This determination is performed in the same manner as previously described with respect to determinator 40. If a match is determined at block 110, the mobile station 28 is not roaming and will send a page accept message back to the MSC 18 and will notify the user of an incoming page via the call indicator 46 (block 112). The call indicator 46 may be a flashing light, a bell generating a ringing tone, a vibrating element or any other device alerting the user to an incoming phone call. Depending on whether or not the user answers the call (block 114), the GCS 24 will either include a voice path for the mobile station 28 into the conference calling bridge (block 116), or will not include a voice path for the mobile station 28 into the conference calling bridge (block 118).

If determinator 48 determines that the system is roaming at block 110, determinator 50 then determines whether the call is a group call (block 120). The determinator 50 determines if the phone number in the caller line ID field of the page message matches any of the group phone numbers stored in the group storage location (locations 1–25 in the memory 58). For example, since the group phone numbers for the mobile station 28 are stored in memory locations 1–25, if the phone number in the caller line ID field of the page message matches any of the group phone numbers stored in memory locations 1–25, the mobile station is receiving a group call.

If it is decided at block 120 that the incoming call is not a group call, then determinator 51 determines if non-group incoming calls are allowed while roaming (block 122) by determining the state of the group only flag 70 stored in the memory 58. If it is determined that non-group incoming calls are not allowed when roaming at block 122, a page rejection message is sent to the MSC 18 (block 124) and the call request to the mobile station 28 is terminated.

If it is determined that non-group calls may be received while roaming (at block 122), the determinator 51 then determines if incoming calls are restricted to those stored in the memory 58 (block 126) by determining the state of the memory only flag 72. If the memory only flag 72 is determined to be disabled at block 126 (i.e., it does not limit incoming calls), a page accept message is sent to the MSC 18 (block 112) and, depending whether the user answers the call (block 114), they are either included (block 116) or not included (block 118) in the conference call bridge.

If the memory only flag 72 is determined to be enabled at block 126, the determinator 51 determines if the call is from a phone number stored in the memory 58 (block 128) by determining if the phone number in the caller line ID field of the page message matches any of the phone numbers stored in the memory 58. If a match is found (at block 128), a page accept message is sent to the MSC 18 (block 112) and, depending whether the user answers the call (block 114), a voice path to the user is either established (block 116) or not established (block 118) to the call. If a match is not found at block 128, a page rejection message is sent to the MSC 18 (block 124) and the call request to the mobile station 28 is terminated.

If the call is determined to be a group call at block 120, then the determinator 52 determines if the mobile station 28 is permitted to receive that particular group call while roaming (block 130) by determining the state of the RREF for that particular group phone number. If it is determined that the RREF is disabled (at block 130), prohibiting the receipt of calls from that particular group phone number while the mobile station 28 is roaming, a page rejection message is sent to the MSC (block 124) and the call request to the mobile station 28 is terminated. If it is determined that the RREF is enabled (at block 130), indicating that the mobile station 28 is permitted to receive calls from that particular group phone number while roaming, a page accept message is sent to the MSC 18 via acceptor 44 and the user is notified of the incoming page via the call indicator 46 (block 112). Depending on whether the user answers the call (block 114), they are either included (block 116) or not included (block 118) in the conference call bridge.

While the invention has been described with particular reference to the drawings, it should be understood that various modifications could be made without departing from the spirit and scope of the present invention.

What is claimed is:

1. A method of placing a phone call from an originating mobile station to a group of receiving stations collectively having a group identification number, said method comprising the steps of:
   (a) providing a first permission for said originating mobile station to place calls to a first group identification number while roaming and providing a second permission for said origination mobile station to place calls to a second group identification number;
   (b) initiating a call at the originating mobile station to a selected one of said first and second group indentification numbers;
   (c) determining if the originating mobile station is in a roaming condition;
   (d) if the originating mobile station is roaming as determined at step (c), determining whether said first or second permission associated with said selected one of said group identification numbers permits the originating mobile station to place calls to the selected group identification number while roaming; and
   (e) if the originating mobile station is permitted to place calls to the selected one of said group identification numbers while roaming as determined at step (d), placing a call to a selected group of receiving stations defined by the selected group identification number.

2. The method of claim 1, further comprising the step of:
   (f) if the originating mobile station is not permitted to place calls to the selected one of said group identification numbers while roaming as determined at step (d), informing a user that the call is forbidden while roaming.

3. A method of placing a phone call from an originating mobile station to a group of receiving stations collectively having a group identification number, wherein there are a plurality of wireless communication systems each having a discrete system identification number and distinct geographical boundaries, one of said plurality of wireless communication systems being a home wireless communication system associated with the originating mobile station, with the originating mobile station physically within the geographical boundaries of the home wireless communication system in a non-roaming condition, the home wireless communication system having a home system identification number stored in a memory in the originating mobile station, said method comprising the steps of:
   (a) initiating a call at the originating mobile station to a selected group identification number;
   (b) determining if the originating mobile station is in a roaming condition by receiving, at the originating mobile station, a system identification number of a wireless communication system within which the originating mobile station has initiated a call to the selected group identification number, and determining if the received system identification number matches the home system identification number;
   (c) if the originating mobile station is roaming as determined at step (b), determining whether the originating mobile station is permitted to place calls to the selected group identification number while roaming; and
   (d) if the originating mobile station is permitted to place calls to the selected group identification number while roaming as determined at step (c), placing a call to a selected group of receiving stations defined by the selected group identification number.

4. A method of placing a phone call from an originating mobile station to a group of receiving stations collectively having a group identification number, said method comprising the steps of:
   (a) initiating a call at the originating mobile station to a selected group identification number;

(b) determining if the originating mobile station is in a roaming condition;

(c) if the originating mobile station is roaming as determined at step (b), determining whether the originating mobile station is permitted to place calls to the selected group identification number while roaming; and (d) if the originating mobile station is permitted to place calls to the selected group identification number while roaming as determined at step (c), placing a call to a selected group of receiving stations defined by the selected group identification number;

(e) storing a plurality of group identification numbers in a memory at the originating mobile station, one of said plurality of group identification numbers being the selected group identification number; and (f) storing a roam-enable flag in the memory for each of the plurality of group identification numbers, each roam-enable flag selectively settable between (a) a first state permitting calls to a particular group identification number with which it is associated with the originating mobile station in a roaming condition, and (b) a second state prohibiting calls to the particular group identification number with which it is associated with the originating mobile station in a roaming condition, wherein step (c) comprises the step of checking the state of the roam-enable flag associated with the selected group identification number.

5. A method of connecting a phone call from an originating station having an originating identification number to a plurality of receiving stations collectively having a group identification number, said method comprising the steps of:

(a) providing a first permission for a select one of said plurality of receiving stations to receive calls to a first group identification number while roaming and providing a second permission for said select receiving station to receive calls to a second group identification number;

(b) initiating a call request at an originating station to a selected one of said group identification numbers;

(c) receiving the call request, with the selected group identification number, at a Group Call Server (GCS);

(d) routing a page message to each of a plurality of receiving stations included within the selected group;

(e) receiving the page message at the select one of the plurality of receiving stations, said select receiving station comprising a mobile station;

(f) determining if the select mobile receiving station is in a roaming condition;

(g) if the select mobile receiving station is roaming as determined at step (f), determining if the received page message defines a group call;

(h) if the received page message defines a group call as determined at step (g), determining whether said first or second permission associated with said selected one of said group identification numbers permits the select mobile receiving station to receive calls from the selected group identification number while roaming; and (i) accepting the call from the originating station if all of the conditions in steps (f)–(h) are determined to be present.

6. The method of claim 5, wherein the step of accepting the call from the originating station comprises the step of activating an indicator at the select mobile receiving station alerting a user to an incoming call.

7. The method of claim 6, wherein the activating step generates a ringing tone at the select mobile receiving station.

8. A method of connecting a phone call from an originating station having an originating identification number to a plurality of receiving stations collectively having a group identification number, wherein there are a plurality of wireless communication systems each having a discrete system identification number and distinct geographical boundaries, one of said plurality of wireless communication systems being a home wireless communication system associated with the select mobile receiving station, with the select mobile receiving station physically within the geographical boundaries of the home wireless communication system in a nonroaming condition, the home wireless communication system having a home system identification number stored in a memory in the select mobile receiving station, said method comprising the steps of:

(a) initiating a call request at an originating station to a selected group identification number;

(b) receiving the call request, with the selected group identification number, at a Group Call Server (GCS);

(c) routing a page message to each of a plurality of receiving stations included within the selected group;

(d) receiving the page message at a select one of the plurality of receiving stations, said select receiving station comprising a mobile station;

(e) determining if the select mobile receiving station is in a roaming condition by receiving, at the select mobile receiving station, a system identification number of a wireless communication system within which the select mobile receiving station has received the page message, and determining if the received system identification number matches the home system identification number;

(f) if the select mobile receiving station is roaming as determined at step (e), determining if the received page message defines a group call;

(g) if the received page message defines a group call as determined at step (f), determining whether the select mobile receiving station is permitted to receive calls from the selected group identification number while roaming; and (h) accepting the call from the originating station if all of the conditions in steps (e)–(g) are determined to be present.

9. A method of connecting a phone call from an originating station having an originating identification number to a plurality of receiving stations collectively having a group identification number, said originating identification number being included in a Caller Line Identification (CLI) field of the initiated call request, said method comprising the steps of:

(a) initiating a call request at an originating station to a selected group identification number;

(b) receiving the call request, with the selected group identification number, at a Group Call Server (GCS);

(c) routing a page message to each of a plurality of receiving stations included within the selected group;

prior to or during step (c), replacing the originating identification number with the selected group identification number in the CLI field at the GCS;

(d) receiving the page message at a select one of the plurality of receiving stations, said select receiving station comprising a mobile station;

(e) determining if the select mobile receiving station is in a roaming condition;

(f) if the select mobile receiving station is roaming as determined at step (e), determining if the received page message defines a group call;

(g) if the received page message defines a group call as determined at step (f), determining whether the select mobile receiving station is permitted to receive calls from the selected group identification number while roaming;

(h) accepting the call from the originating station if all of the conditions in steps (e)–(g) are determined to be present; and storing, in memory at the select mobile receiving station, group identification numbers for each group of which the select mobile receiving station is a member, wherein step (f) comprises the step of determining if the selected group identification number in the CLI field of the page message matches any of the group identification numbers stored in the memory at the select mobile receiving station.

10. A method of connecting a phone call from an originating station having an originating identification number to a plurality of receiving stations collectively having a group identification number, said method comprising the steps of:

(a) storing, in a memory at the select mobile receiving station, group identification numbers for each group of which the select mobile receiving station is (b) storing a roam-enable flag in the memory for each group identification number, each roam-enable flag selectively settable between (A) first state permitting calls from a particular group identification number to be received at a select one of the mobile receiving stations with the select mobile receiving station in a roaming condition, and (B) a second state prohibiting calls from the particular group identification number to the select mobile receiving station with the select mobile receiving station in a roaming condition, a member;

(c) initiating a call request at an originating station to a selected group identification number;

(d) receiving the call request, with the selected group identification number, at a Group Call Server (GCS);

(e) routing a page message to each of a plurality of receiving stations included within the selected group;

(f) receiving the page message at the select one of the plurality of receiving stations, said select receiving station comprising a mobile station;

(g) determining if the select mobile receiving station is in a roaming condition;

(h) if the select mobile receiving station is roaming as determined at step (g), determining if the received page message defines a group call;

(i) if the received page message defines a group call as determined at step (h), determining whether the select mobile receiving station is permitted to receive calls from the selected group identification number while roaming; and (j) accepting the call from the originating station if all of the conditions in steps (g)–(i) are determined to be present;

wherein step (i) comprises the step of checking the state of the roam-enable flag associated with the selected group identification number.

11. A method of connecting a phone call from an originating mobile station having an originating identification number to a group of receiving stations collectively having a group identification number, said method comprising the steps of:

(a) initiating a call request at the originating mobile station to a selected group identification number;

(b) determining if the originating mobile station is in a roaming condition;

(c) if the originating mobile station is roaming as determined at step (b), determining whether the originating mobile station is permitted to place calls to the selected group identification number while roaming; and (d) if the originating mobile station is permitted to place calls to the selected group identification number while roaming as determined at step (c):

(d1) sending the initiated call request to a Group Call Server (GCS);

(d2) receiving the call request, with the selected group identification number, at the GCS;

(d3) routing a page message to each of a group of receiving stations included within the selected group;

(d4) receiving the page message at a select one of the group of receiving stations, said select receiving station comprising a mobile station;

(d5) determining if the select mobile receiving station is in a roaming condition;

(d6) if the select mobile receiving station is roaming as determined at step (d5), determining if the received page message defines a group call;

(d7) if the received page message defines a group call as determined at step (d6), determining whether the select mobile receiving station is permitted to receive calls from the selected group identification number while roaming; and (d8) accepting the call from the originating mobile station if all of the conditions in steps (d5)–(d7) are determined to be present or if the condition in step (d5) is determined to be not present.

12. A mobile station for use in a wireless communication system for selectively placing group phone calls to a plurality of receiving stations included within a selected group, said mobile station comprising:

a memory storing a plurality of group phone numbers and a roam origination enable flag for each group phone number, said roam origination enable flags selectively settable between (a) a first state permitting calls to a particular group phone number with the mobile station in a roaming condition, and (b) a second state prohibiting calls to the particular group phone number with the mobile station in a roaming condition;

a call initiator operable by a user to initiate a call to one of the plurality of group phone numbers stored in the memory;

a first determinator determining whether the mobile station is in a roaming condition;

a second determinator adapted to determine the state of the roam origination enable flag associated with said one of the plurality of group phone numbers; and a processor adapted to block call transmission responsive to the first and second determinators.

13. The mobile station of claim 12, further comprising a call forbidden indicator responsive to the processor blocking a call to inform the user that the call is forbidden.

14. The mobile station of claim 12, usable in a plurality of wireless communication systems each having a discrete system identification number and distinct geographical boundaries, one of said plurality of wireless communication systems being a home wireless communication system associated with the mobile station, with the mobile station physically within the geographical boundaries of the home wireless communication system in a non-roaming condition, the home wireless communication system having a home system identification number stored in the memory in the mobile station, wherein the first determinator is adapted to receive a system identification number of a wireless communication system within which the mobile station has initiated the call to said one of the plurality of group phone numbers, and is further adapted to compare the received system identification number with the home system identification number stored in the memory to determine whether the mobile station is in a roaming condition.

15. The mobile station of claim 12, wherein the processor blocks the call if:

(a) the first determinator determines that the mobile station is roaming; and (b) the second determinator determines that the roam origination enable flag associated with said one of the plurality of group phone numbers is in its second state.

16. A mobile station for use in a wireless communication system for selectively receiving group phone calls from an originating station, said mobile station comprising:

a memory storing a plurality of group phone numbers for each group of which the mobile station is a member and a roam receive enable flag for each group phone number, said roam receive enable flags selectively settable between (a) a first state permitting calls from a particular group phone number to be received at the mobile station with the mobile station in a roaming condition, and (b) a second state prohibiting calls from the particular group phone number to be received at the mobile station with the mobile station in a roaming condition;

a transceiver adapted to receive a signal, including a group phone number, indicating that a call has been placed to the mobile station;

a first determinator adapted to determine if the mobile station is in a roaming condition;

a second determinator adapted to determine if the received signal defines a group call;

a third determinator adapted to determine the state of the roam receive enable flag associated with the received group phone number; and an accepter adapted to accept the call responsive to the first, second and third determinators.

17. The mobile station of claim 16, further comprising a call indicator adapted to inform a user of an accepted call.

18. The mobile station of claim 16, wherein:

the memory further stores a home system identification number; and the first determinator is adapted to receive a system identification number of a wireless communication system which transmits the received signal, said first determinator determining that the mobile station is in a roaming condition if the received system identification number is different from the home system identification number.

19. The mobile station of claim 16, wherein the signal is a page message including a Caller Line Identification (CLI) field including a phone number, and the second determinator is adapted to compare a phone number in a received signal with the plurality of group phone numbers stored in said memory.

20. The mobile station of claim 16, wherein the accepter accepts the call if:

(a) the first determinator determines that the mobile station is roaming;

(b) the second determinator determines that the received signal defines a group call; and (c) the third determinator determines that the roam receive enable flag associated with the received group phone number is in its first state.

\* \* \* \* \*